(12) United States Patent
Schekochikhin et al.

(10) Patent No.: US 9,569,195 B2
(45) Date of Patent: Feb. 14, 2017

(54) SYSTEMS AND METHODS FOR LIVE OPERATING SYSTEM UPGRADES OF INLINE CLOUD SERVERS

(71) Applicants: Arcady Schekochikhin, San Jose, CA (US); Srikanth Devarajan, San Jose, CA (US)

(72) Inventors: Arcady Schekochikhin, San Jose, CA (US); Srikanth Devarajan, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 312 days.

(21) Appl. No.: 14/276,785

(22) Filed: May 13, 2014

(65) Prior Publication Data

US 2015/0331692 A1    Nov. 19, 2015

(51) Int. Cl.
*G06F 9/44* (2006.01)
*G06F 9/445* (2006.01)
*G06F 9/50* (2006.01)

(52) U.S. Cl.
CPC .............. *G06F 8/65* (2013.01); *G06F 9/441* (2013.01); *G06F 9/4416* (2013.01); *G06F 9/5077* (2013.01)

(58) Field of Classification Search
CPC ...... G06F 9/441; G06F 9/4416; G06F 9/5077; G06F 8/65
USPC ............................................................ 713/2
See application file for complete search history.

(56) References Cited

U.S. PATENT DOCUMENTS

| | | | |
|---|---|---|---|
| 5,870,757 A * | 2/1999 | Fuller | G06F 11/1471 |
| 6,308,265 B1 * | 10/2001 | Miller | G06F 11/1433 |
| | | | 710/10 |
| 7,418,439 B2 | 8/2008 | Wong | |
| 8,032,899 B2 | 10/2011 | Archer et al. | |
| 8,239,662 B1 | 8/2012 | Nelson | |
| 8,572,362 B2 | 10/2013 | Castillo | |
| 8,949,585 B2 * | 2/2015 | Hiltgen | G06F 9/4406 |
| | | | 713/2 |
| 2005/0132121 A1 | 6/2005 | Robinson | |
| 2007/0136721 A1 | 6/2007 | Dunshea | |

OTHER PUBLICATIONS

Jay Fink, Using nullfs: I, systhread.net, Feb. 2007, available online at http://systhread.net/texts/200702nullfsl.php.

* cited by examiner

*Primary Examiner* — Thuan Du
(74) *Attorney, Agent, or Firm* — Clements Bernard Walker PLLC; Lawrence A. Baratta, Jr.; Christopher L. Bernard

(57) ABSTRACT

An upgrade method for a Unix or Unix-like operating system, a server, and a cloud-based system include operating a server with an old operating system with a partition structure for media, wherein the partition structure includes a root partition and a usr partition; copying media to the root partition and the usr partition associated with a new operating system while the old operating system is operating; rebooting the server with the new operating system set to load; and subsequent to the rebooting, making the root partition persistent using memory and the usr partition persistent using a NULL file system.

16 Claims, 7 Drawing Sheets

SYSTEMS AND METHODS FOR LIVE OPERATING SYSTEM UPGRADES OF INLINE CLOUD SERVERS

FIELD OF THE DISCLOSURE

The present disclosure relates generally to computer systems and methods. More particularly, the present disclosure relates to systems and methods for live operating system upgrades of inline cloud servers.

BACKGROUND OF THE DISCLOSURE

Situations arise when operating system (OS) software has to be upgrade on already deployed Information Technology (IT) systems such as collocated web servers, cloud servers, etc. (collectively referred to herein as servers). The servers described herein utilize UNIX operating systems and variants thereof such as FreeBSD, Linux, and the like. The servers can include generic media allocation/partitioning schemas where there is only place for one OS (Operating System) image. Specifically, the servers can include a single partition for <root> and a single partition for <usr> filesystems. Disadvantageously, when the current OS has to be upgraded in these configurations, this upgrade cannot be done online. First, this limitation is because, in order to run the upgrade procedure, the OS should be running, but this is the same live OS that is being upgraded and in the same location. Second, in case something goes wrong, for example, the OS image is in an intermediate state and the whole system becomes inoperable. Thus, conventionally, such upgrades must be implemented offline—such as via some special OS image that is sitting "aside" of the main media and after booting up is able to access such media and do operations required, e.g., an offline agent. The offline agent has to be imbedded at the server procurement stage or by some special means like Intelligent Platform Management Interface (IPMI) virtual drivers. There are several disadvantages based on the aforementioned limitations. A live system cannot be easily upgraded due to the need for OS to access in for live operating the same files that upgrade process has to change. If a live upgrade is possible, then there is large time window where media is in an intermediate inoperable state. Finally, such an upgrade is destructive which cannot be rolled back after the upgrade (at least not without going through the whole upgrade—or downgrade in this case—procedure as whole).

BRIEF SUMMARY OF THE DISCLOSURE

In an exemplary embodiment, an upgrade method for a Unix or Unix-like operating system includes operating a server with an old operating system with a partition structure for media, wherein the partition structure comprises a root partition and a usr partition; copying media to the root partition and the usr partition associated with a new operating system while the old operating system is operating; rebooting the server with the new operating system set to load; and subsequent to the rebooting, making the root partition persistent using memory and the usr partition persistent using a NULL file system.

In another exemplary embodiment, a server includes a network interface; a data store; a processor communicatively coupled to the network interface and the data store; and memory storing instructions that, when executed, cause the processor to: operate an old operating system with a partition structure for the data store, wherein the partition structure comprises a root partition and a usr partition; copy media to the root partition and the usr partition associated with a new operating system while the old operating system is operating; reboot with the new operating system set to load; and subsequent to the reboot, make the root partition persistent using the memory and the usr partition persistent using a NULL file system.

In yet another exemplary embodiment, a cloud-based system includes a plurality of nodes communicatively coupled to one or more users, wherein the plurality of nodes each perform inline monitoring for one of the one or more users for security; wherein the plurality of nodes operate a Unix or Unix-like operating system; wherein each of the plurality of nodes comprise: a network interface communicatively coupled to the one or more users; a data store; a processor communicatively coupled to the network interface and the data store; memory storing instructions that, when executed, cause the processor to: operate an old operating system with a partition structure for the data store, wherein the partition structure comprises a root partition and a usr partition; copy media to the root partition and the usr partition associated with a new operating system while the old operating system is operating; reboot with the new operating system set to load; and subsequent to the reboot, make the root partition persistent using the memory and the usr partition persistent using a NULL file system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 2 is a logical diagram of a hard drive and memory of a server, such as the server of FIG. 1 and the like;

DETAILED DESCRIPTION OF THE DISCLOSURE

In various exemplary embodiments, systems and methods for live operating system upgrades of inline cloud servers are described which address the aforementioned limitations. The systems and method implement a special schema of media allocation that could be applied post-factum (on the live system that was never specially designed for such upgrade), do not have any downtime except for a single reboot required to restart the OS kernel, allow multiple OS images to reside side by side (including the one that was there from the beginning), that could be switched easily, and the like. Thus, in a single <root> partition system, the only requirement is available disk space. The systems and methods apply to UNIX and UNIX-like operating systems. An important aspect of the systems and methods is to prevent any damage to the existing image allowing an easy return back to the original setup if anything goes wrong. The systems and methods allow multiple runnable images up to the amount a hard drive partition would accommodate. Advantageously, the systems and methods make the in-memory root file system persistent without manually backing up changes and overlaying those at every reboot. Also, the systems and methods, with the big (and not suitable for in-memory file system)<usr> partition, convert file hierarchy into the 'regular' file-system to be able to continue with the plain approach that the OS generally uses.

Figure 1:
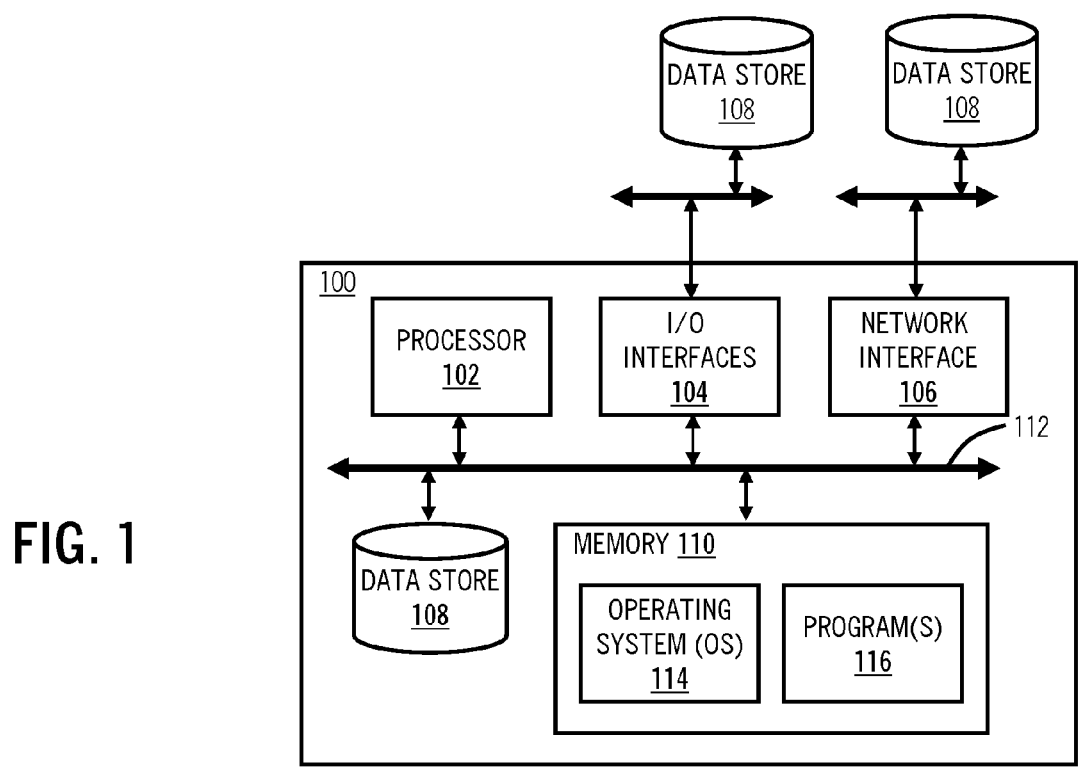
FIG. 1 is a block diagram of a server which may be used in a distributed security system or other cloud-based system.

Referring to FIG. 1, in an exemplary embodiment, a block diagram illustrates a server 100 which may be used in the system 100, in other systems, or standalone. The server 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 1 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 may be used to receive user input from and/or for providing system output to one or more devices or components. User input may be provided via, for example, a keyboard, touch pad, and/or a mouse. System output may be provided via a display device and a printer (not shown). I/O interfaces 104 may include, for example, a serial port, a parallel port, a small computer system interface (SCSI), a serial ATA (SATA), a fiber channel, Infiniband, iSCSI, a PCI interface (PCI, PCI-X or PCI-E), an infrared (IR) interface, a radio frequency (RF) interface, and/or a universal serial bus (USB) interface.

The network interface 106 may be used to enable the server 100 to communicate on a network, such as the Internet, a wide area network (WAN) a local area network (LAN), a wireless network, etc. The network interface 106 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the server 100 such as, for example, an internal hard drive connected to the local interface 112 in the server 100. Additionally in another embodiment, the data store 108 may be located external to the server 100 such as, for example, an external hard drive connected to the I/O interfaces 104 (e.g., SCSI or USB connection). In a further embodiment, the data store 108 may be connected to the server 100 through a network, such as, for example, a network attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another, but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein. In the various exemplary embodiments described herein, the operating system 114 is Unix or Unix-like with only one partition for root and one partition for usr files.

Figure 2:
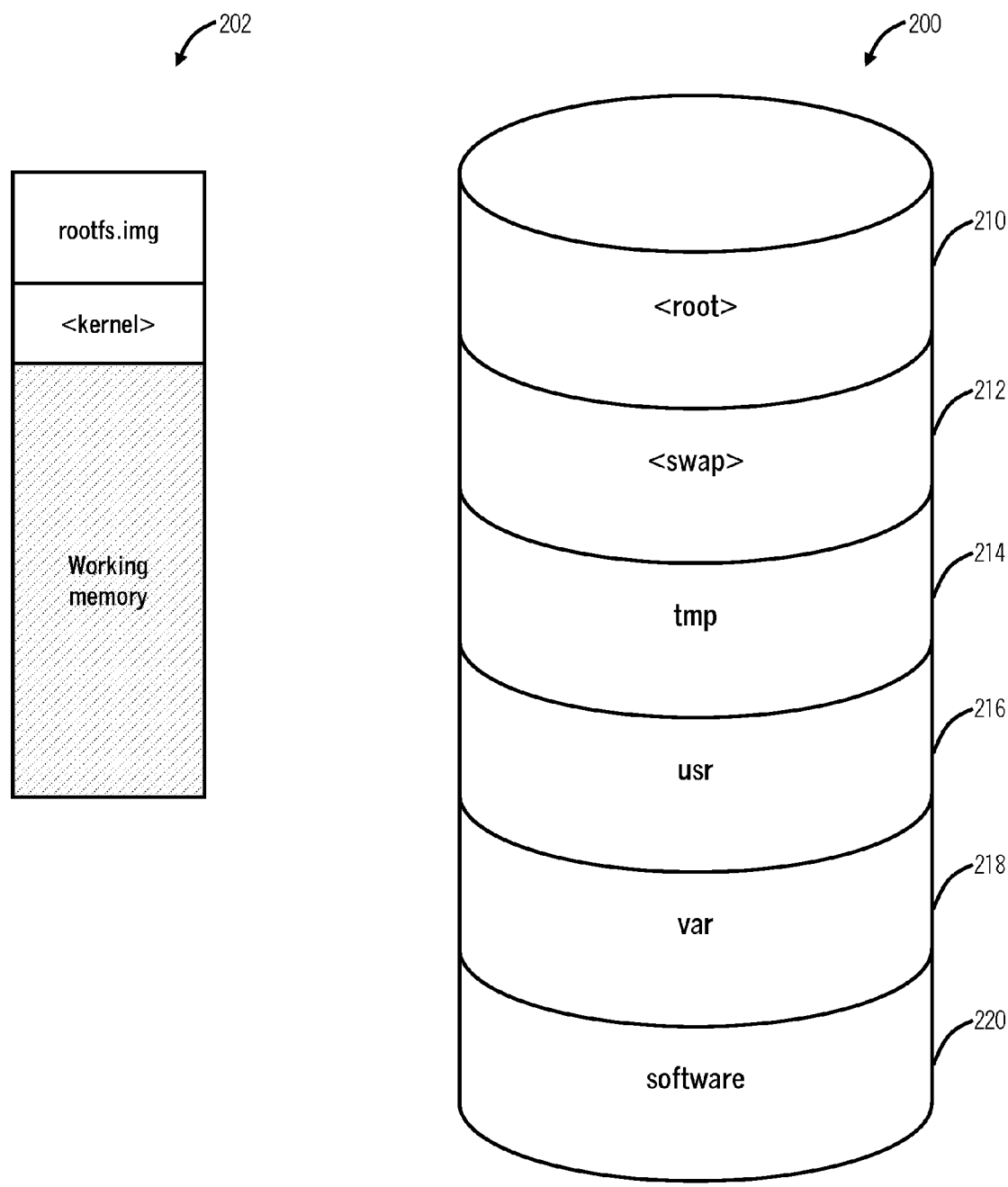

Referring to FIG. 2, in an exemplary embodiment, a logical diagram illustrates a hard drive 200 and memory 202 of a server, such as the server 100 and the like. The server associated with the hard drive and the memory 202 operates a Unix-based or Unix-like operating system such as, GNU/Linux, OS X, BSD, Solaris, etc. The logical diagram of the hard drive 200 illustrates various partitions 210-220 that are logical divisions of the hard drive 200. The hard drive 200 includes a <root> partition 210, a <swap> partition 212, a temporary (tmp) partition 214, a user (usr) partition 216, a variable (var) partition 218, and a general software partition 220. The partitions 210-220 are associated with a generic server such as the server 100 for implementing various functions such as a cloud server, a web server, etc. The hard drive 200 includes the aforementioned partitioning schema implemented in attempt to isolate different portions of the OS image (this kind of partitioning is generic in the industry) in order to improve stability and/or possible downtime of the server.

The <root> partition 210 is the operating system partition from where the Unix-based or Unix-like operating system boots. The <swap> partition 212 is utilized by the operating system for virtual memory management. The <tmp> partition 214 is required for temporary files. The server 100 cannot simply use the memory 202 for temporary files; thus the <tmp> partition 214 is used. The <usr> partition 216 is another system partition like the partitions 210, 212, 214 and is where additional system programs and data reside. The <var> partition 218 is where various logs are maintained, and the various logs may be quite large given the number of users serviced by the server 100. Finally, the general software partition 220 is a software data partition, where special files are residing, implementing the core functionality of the particular services offered by the server 100.

Figure 3:
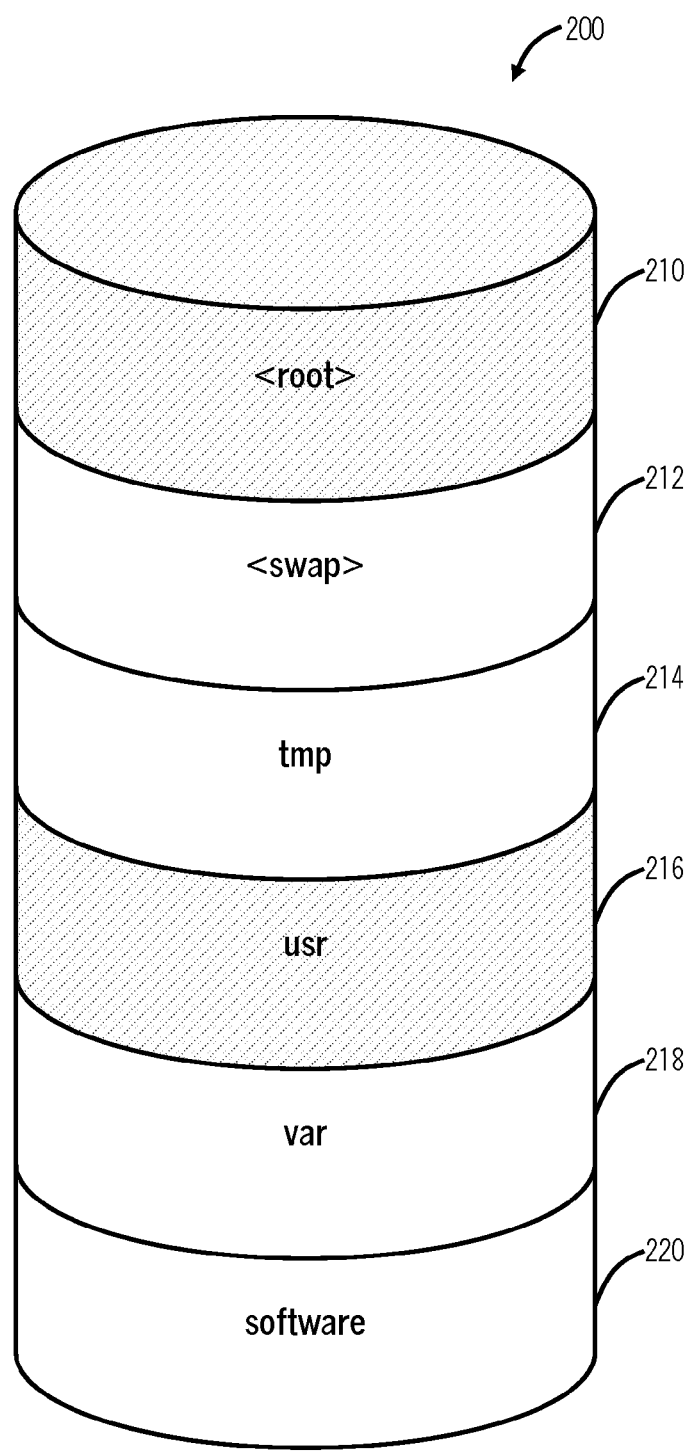
FIG. 3 is a logical diagram of the hard drive of the server, such as the server of FIG. 1 and the like, showing the partitions that are involved in an upgrade.

Referring to FIG. 3, in an exemplary embodiment, a logical diagram illustrates the hard drive 200 of the server, such as the server 100 and the like, showing the partitions 210, 216 that are involved in an upgrade. Specifically, in a live system, the only parts that have to be upgraded for new operating system software are the <root> partition 210 and the <usr> partition 216. The <swap> partition 212, the <tmp> partition 214, and the <var> partition 218 can be reused. On the two partitions 210, 216 that require upgrade, the operating system kernel itself and all system utilities reside. The kernel generally is software that manages requests amongst programs operating in the server. The kernel by itself is not a problem as it is read into the memory during boot time and could be changed/replaced using standard procedures at any time and upgraded, and one will become active only after the next system reboot. However, various system tools and libraries are required by the upgrade process, and this can be quite involving. These tools and libraries cannot be easily overwritten. Further, overwriting these tools and libraries cause the original operating system image to disappear, and the only way to roll back would be to restore the operating system image from some backup storage.

Figure 4:
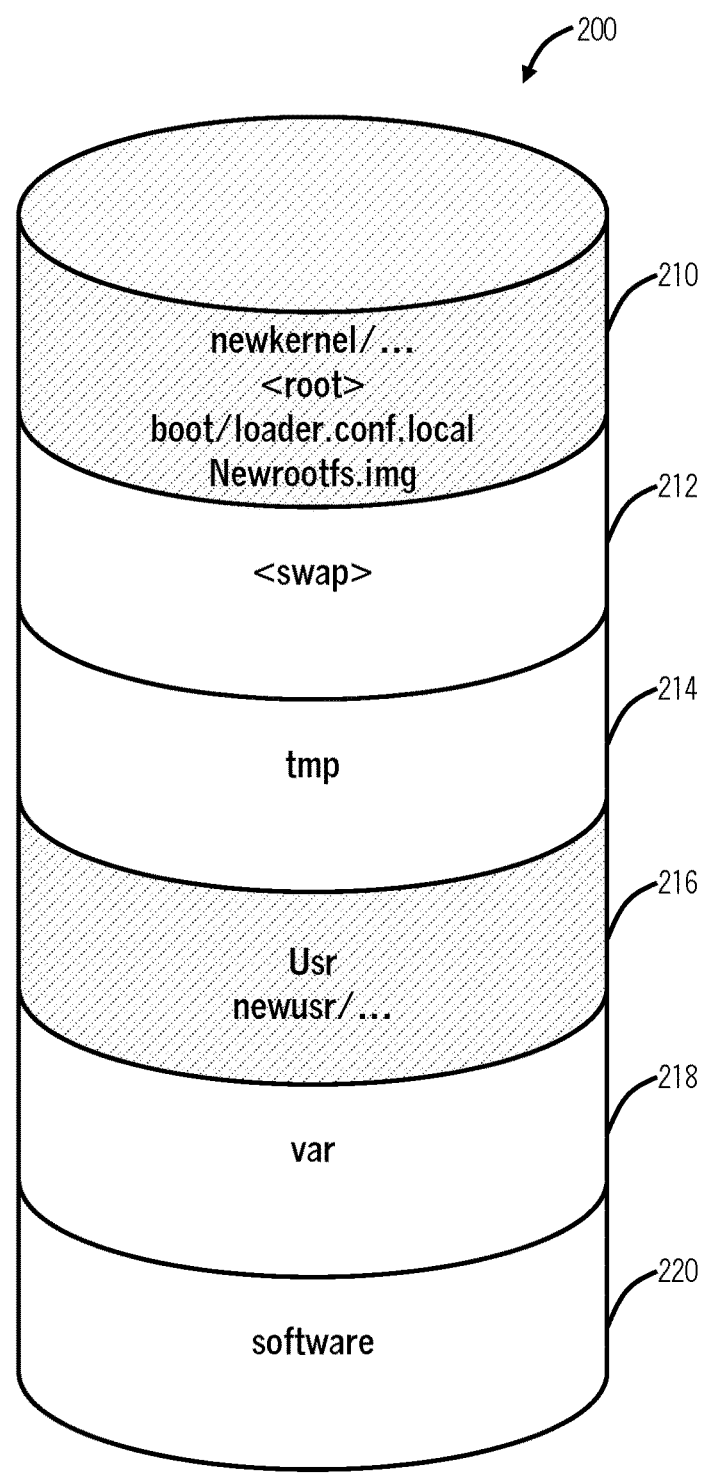
FIGS. 4-5 are logical diagrams of the hard drive of the server, such as the server of FIG. 1 and the like, showing the partitions that are involved in an upgrade with a changed media layout.
Figure 5:
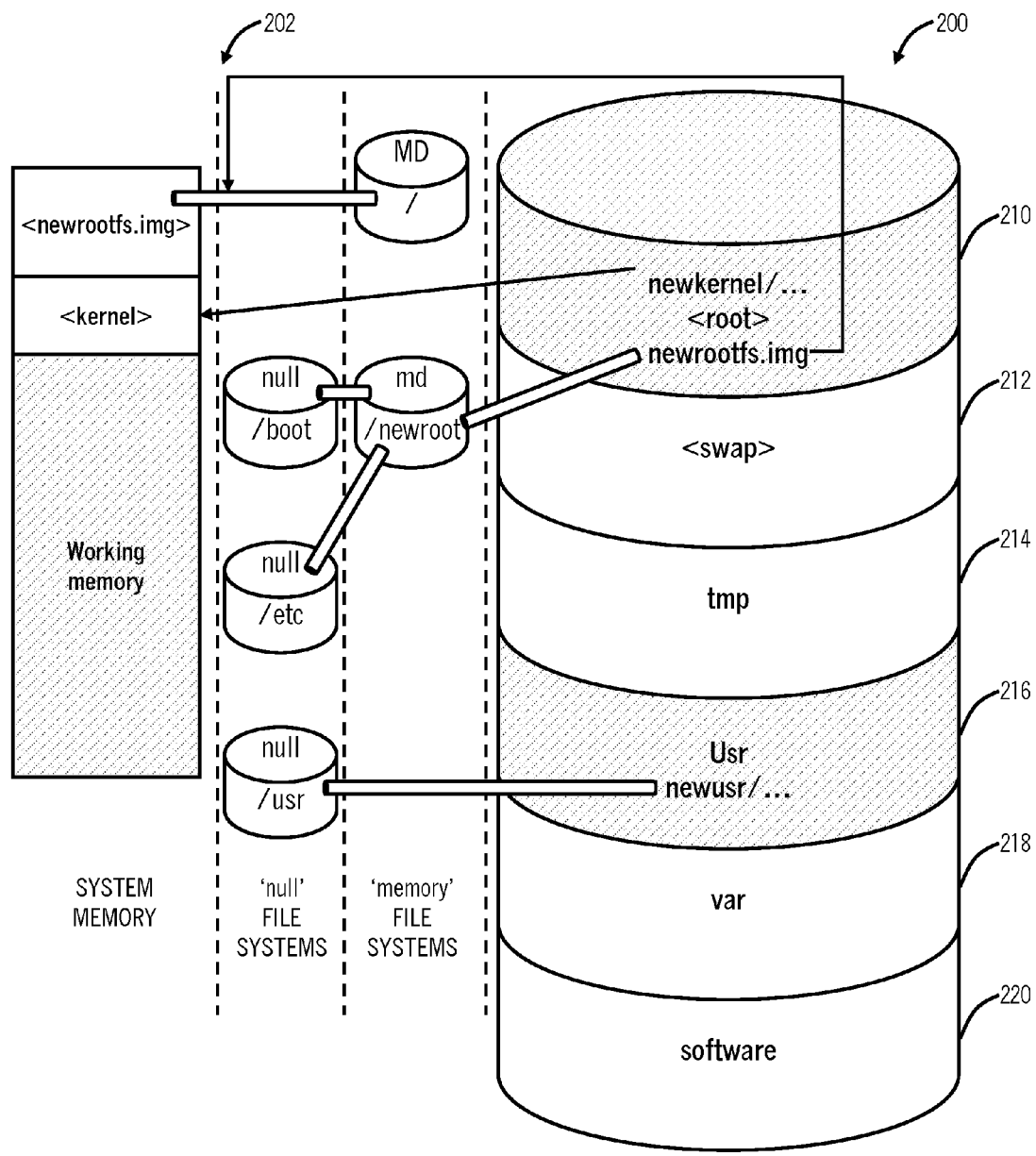

Referring to FIGS. 4-5, in an exemplary embodiment, logical diagrams illustrate the hard drive 200 of the server, such as the server 100 and the like, showing the partitions 210, 216 that are involved in an upgrade with a changed media layout. Specifically, the systems and methods for live operating system upgrades solve the various limitations described herein by changing media layout in the partitions 210, 216. FIG. 4 illustrates the added files to the partitions 210, 216 and FIG. 5 illustrates the media layout subsequent to a reboot with the new operating system operational after the added files in FIG. 4. This changed media layout allows two Unix or Unix-like operating systems to share the same partition 210. With the systems and methods, the ROOT file system of the new operating system resides in the memory 202 (similar to other existing live boot schemas), but unlike the existing live boot schemas, the kernel and USR coexists with the original old operating system. Also, the ROOT file system persistency problem is solved in a novel manner.

In FIG. 4, new media is added while the old operating system is operational and parts of existing media of the old operation system involved are the <root> partition 210 where a new ROOT filesystem image is copied (as a plain file) as well as a new bootable kernel (in the directory with all kernel modules, located in "parallel" with existing old kernel associated with the old operating system). Also, the <usr> partition 216 is used to host a new USR file tree, but this does not have a file system on its own, but instead simple resides in a separate directory. This way the only disturbance created for the old operating system while operational are two new directories and a data file (note, assuming that the media has enough space for those). One last change is a new file created in the boot directory that is a standard "localization" config file that is always part of the boot up process (boot/loader.conf.local).

Upon reboot in FIG. 5, using instructions in the config file, a boot process loads the new operating kernel into the memory 202 and also loads the image of the new ROOT filesystem and instructs the kernel to use this image as its future ROOT file system. Next in the boot process, the kernel mounts this in-memory ROOT file system and reads its configuration that governs the media mounting process. The regular SWAP, TMP and VAR partitions 212, 214, 218 are used as is and simply mounted at the appropriate mount points. The USR filesystem does not exists but the new operating system has a so called NULLFS which is a way to convert a directory into the mountable "filesystem"—this is all that is needed to properly attach the USR filesystem and start to use it—boot up process is completed and any software can now be run from the software partition 220, etc. The resulting media structure is presented in FIG. 5. The NULLFS file system is a pass-through file system. When NULLFS is mounted it literally copies the file system transaction. If a file is deleted, NULLFS simply transmits the information down to the lower file system. Conversely, if a file is created, it does the same and tacks on all of the data needed for the file system underneath.

Note, the whole ROOT filesystem is residing in the memory 202 and is not persistent, i.e., any changes made in it will be lost when the server 100 is rebooted. From one point of view, this is good as it cannot break the ROOT file system, but machine administration requires frequent changes such as in some config files residing on this file system. Regular live boot schemas fix this by using special CONFIG partitions and backing up all changed files onto this partition and recover changes at boot time from this partition. This procedure allows for addition and update but not for deletion of files and could only be implemented at relatively late phase of the boot process. The systems and methods solve this problem by using additional memory file system (backed by the ROOT image itself) and NULLFS mounts that replace in-memory /boot and /etc directories with their originals on the image, so any changes are implemented immediately and also backed up in the image file, so those changes would be persistent during the reboot.

Figure 6:
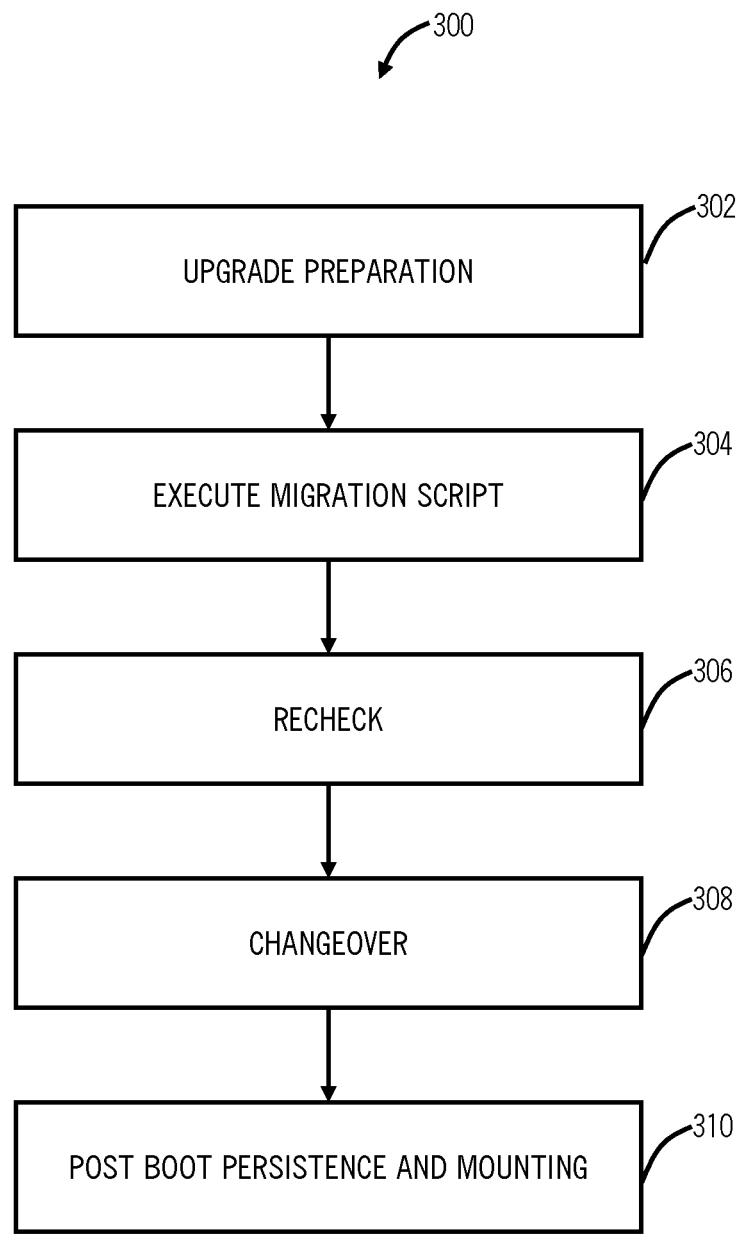
FIG. 6 is a flowchart of an upgrade method for Unix or Unix-like servers with partitions as described herein.

Referring to FIG. 6, in an exemplary embodiment, a flowchart illustrates an upgrade method 300 for Unix or Unix-like servers with partitions as described herein. In an exemplary embodiment, the upgrade method 300 is described with reference to upgrading FreeBSD 7.0 to FreeBSD 8.4; however, those of ordinary skill in the art will recognize the upgrade method 300 contemplates operation with any Unix or Unix-like operating system with similar partition structures as described herein (e.g., a single root partition for the operating system). The upgrade method 300 generally includes a three-step process—slow time-spreaded preparation, recheck and then one time change over. First, the upgrade method 300 includes upgrade preparation (step 302). In the upgrade preparation ROOT and USR images as well as a kernel and build have to be uploaded to a server being upgraded. For example, FreeBSD 8.4 has a total size for these files of around 400 Mb. The delivery can be off-line using any known method, e.g., over a network, a flash drive, a CDROM, a DVD, etc.

Next, the upgrade method 300 includes executing a migration script (step 304). The migration script performs several functions including 1) creating a root file system image for this particular machine and populating it with all device-specific information (/etc/rc.conf, /etc/fstab, /etc/sysctl.conf, /etc/resolv.conf and so on), 2) installing a new kernel in parallel with existing one (e.g., a FreeBSD 8.4 kernel in parallel with a FreeBSD 7.0 kernel), and 3) unrolling a new user partition (as a directory tree—no need in whole disk partition). Note, the server can continue to operate during the steps 302, 304. In a cloud-wide deployment, the abovementioned steps can be run cloud-wide in advance. It does not require any downtime, and based on field experience, there is no risk to cause one. All nodes preparation should be completed during the given period of time.

Next, the upgrade method 300 includes a recheck step (step 306). Note, the preparation steps 302, 304 may be done in advance and it is possible that a new build could be rolled in after the preparation steps are completed. This step would check the build from the preparation state. Note, it is advisable to provide some time between the steps 302, 304 and the step 306 so that the server can operate with the new operating system files coexisting, but not operating. Also the step 306 makes sure that migrated configuration is up to date, e.g., Timestamp or MD5 would work. After the step 306, no changes are allowed to the server with respect to operating system changes and build version.

Next, the upgrade method 300 includes a changeover step (step 308). This is the downtime stage. In an exemplary embodiment, the changeover step 308 can be done on a plurality of servers simultaneously in a cloud-wide system. However, the changeover step 308 can be implemented in serial or in clusters of servers in the cloud-wide system. Here, the server switches to boot the new operating system upon reboot.

Finally, the upgrade method 300 performs a post boot persistence and mounting step (step 310). Again, the new kernel is loaded into memory, but the root and usr file systems are not persistent—they are writeable, but not persistent. To achieve persistence, some mounting techniques are used for /etc, /boot and /root directories as described herein. All changes there would be preserved across a boot but will not be reflected in the old operating system file system. All 7 old operating system filesystems and files would be intact (with the only exception of /boot/ loader files which are replaced with appropriate images.) All /home directories are preserved at the same /home base and could be used for both the old and the new operating system. All other filesystems: swap, /tmp, /var, /sc are the same ones that were used in the old operating system. If node has to be reverted back to the old operating system, then 'rm -f/base/ boot/loader.conf.local' and reboot would do the trick (and build should be reinstalled).

Figure 7:
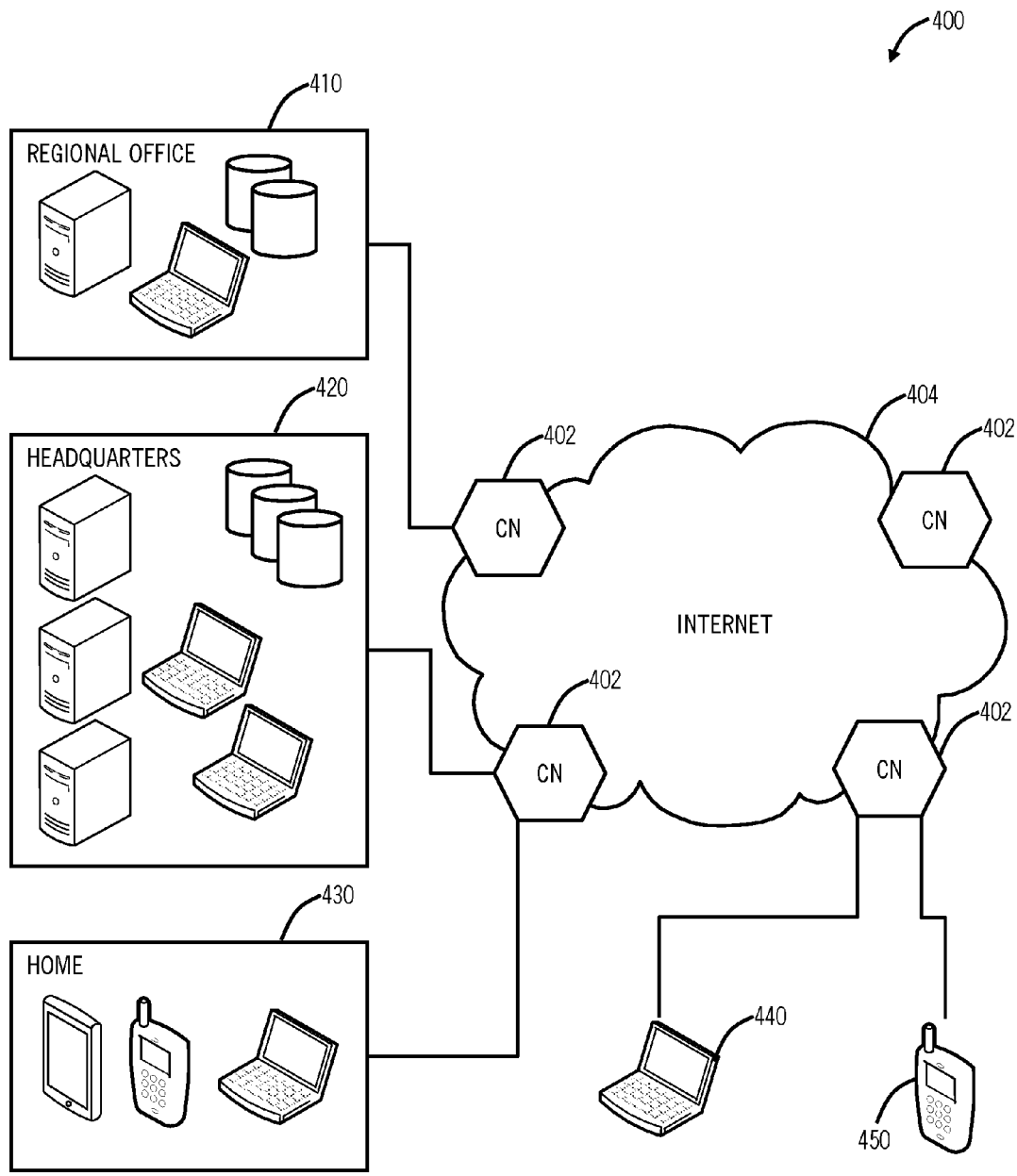
FIG. 7 is a network diagram of a cloud system.

Referring to FIG. 7, in an exemplary embodiment, a network diagram illustrates a cloud system that can use the upgrade method 300. The cloud system 400 includes one or more cloud nodes (CN) 402 communicatively coupled to the Internet 404. The cloud nodes 402 may be implemented as the server 100 or the like with a Unix or Unix-like operating system 214 and a partition structure as described herein. The cloud system 400 may include a distributed security system or another implementation of a cloud based system. In the cloud system 400, traffic from various locations (and various devices located therein) such as a regional office 410, headquarters 420, various employee's homes 430, mobile laptop 440, and mobile device 450 is redirected to the cloud system 400 through the cloud nodes 402. That is, each of the locations 410, 420, 430, 440, 450 is communicatively coupled to the Internet 404 through the cloud nodes 402. The cloud system 400, as the distributed security system, may be configured to perform various functions such as spam filtering, uniform resource locator (URL) filtering, antivirus protection, bandwidth control, data loss prevention, zero day vulnerability protection, Web 2.0 features, malware detection and blocking, and the like. In an exemplary embodiment, the cloud system 400 and the distributed security system may be viewed as Security-as-a-Service through the cloud.

In an exemplary embodiment, the cloud system 400 can be configured to provide mobile device security and policy systems and methods as well as fixed device security. The mobile device 450 may be the mobile device 400, and may include common devices such as smartphones, tablets, netbooks, personal digital assistants, MP3 players, cell phones, e-book readers, and the like. The cloud system 400 is configured to provide security and policy enforcement for devices including the mobile devices 450 in the cloud. Advantageously, the cloud system 400 avoids platform specific security apps on the mobile devices 450, forwards web traffic through the cloud system 400, enables network administrators to define policies in the cloud, and enforces/ cleans traffic in the cloud prior to delivery to the mobile devices 450. Further, through the cloud system 400, network administrators may define user centric policies tied to users, not devices, with the policies being applied regardless of the device used by the user. The cloud system 400 provides 24×7 security with no need for updates, as the cloud system 400 is always up-to-date with current threats and without requiring device signature updates. Also, the cloud system 400 enables multiple enforcement points, centralized provisioning and logging, automatic traffic routing to a nearest cloud node 402, geographical distribution of the cloud nodes 402, policy shadowing of users which is dynamically available at the cloud nodes, etc.

Generally, the distributed security system may generally refer to an exemplary cloud-based security system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. Common shorthand for a provided cloud computing service (or even an aggregation of all existing cloud services) is "the cloud." The distributed security system is illustrated herein as one exemplary embodiment of a cloud-based system, and those of ordinary skill in the art will recognize the cloud based mobile device security and policy systems and methods contemplate operation on any cloud-based system. In view of the foregoing, the systems and methods described herein and, for example, the distributed security system can be viewed as "security as a service" allowing threat detection, malware preclusion, etc. without having native applications installed on each individual user device or user equipment. The systems and methods for live operating system upgrades of inline cloud servers contemplate operation with any type of inline cloud server.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An upgrade method for an operating system, comprising:
    operating server with an old operating system with a partition structure for media, wherein the partition structure comprises a root partition with the old operating system and an usr partition, wherein the operating system only resides in the root partition;
    copying media to the root partition and the usr partition associated with a new operating system while the old operating system is operating in the root partition;
    rebooting the server with the new operating system set to load from the root partition; and
    subsequent to the rebooting, making the root partition persistent using memory and the usr partition persistent using a NULL file system,
    wherein the old operating system and the new operating system reside in the root partition together.

2. The upgrade method of claim 1, further comprising:
    copying the media comprising a new kernel and build associated with the new operating system to the root partition.

3. The upgrade method of claim 1, further comprising:
    copying the media comprising a new file tree for the usr partition.

4. The upgrade method of claim 1, further comprising:
    copying the media comprising a local config file that is executed at the rebooting to load the new operating system.

5. The upgrade method of claim 4, further comprising:
    modifying the local config file to load the old operating system at another reboot.

6. The upgrade method of claim 1, wherein the partition structure further comprises a swap partition, a tmp partition, and a var partition, and the method further comprising:
    mounting the swap partition, the tmp partition, and the var partition subsequent to the rebooting and operating with the new operating system.

7. The upgrade method of claim 1, further comprising:
    executing a migration script on the server to:
        create a root file system for the server with device-specific information;
        install a new kernel for the new operating system in parallel with a kernel for the old operating system; and
        unroll a new usr partition directory tree.

8. A server, comprising:
    a network interface;
    a data store;
    a processor communicatively coupled to the network interface and the data store;
    memory storing instructions that, when executed, cause the processor to:
        operate an old operating system with a partition structure for the data store, wherein the partition structure comprises a root partition with the old operating system and an user partition, wherein an operating system only resides in the root partition;
        copy media to the root partition and the usr partition associated with a new operating system while the old operating system is operating in the root partition;
        reboot with the new operating system set to load from the root partition; and
        subsequent to the reboot, make the root partition persistent using the memory and the usr partition persistent using a NULL file system,
    wherein the old operating system and the new operating system reside in the root partition together.

9. The server of claim 8, wherein the memory storing the instructions that, when executed, further cause the processor to:
    copy the media comprising a new kernel and build associated with the new operating system to the root partition.

10. The server of claim 8, wherein the memory storing the instructions that, when executed, further cause the processor to:
    copy the media comprising a new file tree for the usr partition.

11. The server of claim 8, wherein the memory storing the instructions that, when executed, further cause the processor to:
    copy the media comprising a local config file that is executed at the rebooting to load the new operating system.

12. The server of claim 11, wherein the memory storing the instructions that, when executed, further cause the processor to:
    modify the local config file to load the old operating system at another reboot.

13. The server of claim 8, wherein the partition structure further comprises a swap partition, a tmp partition, and a var partition, and wherein the memory storing the instructions that, when executed, further cause the processor to:
    mount the swap partition, the tmp partition, and the var partition subsequent to the reboot and operate with the new operating system.

14. The server of claim 8, wherein the memory storing the instructions that, when executed, further cause the processor to:
    execute a migration script on the server to:
        create a root file system for the server with device-specific information;
        install a new kernel for the new operating system in parallel with a kernel for the old operating system; and
        unroll a new usr partition directory tree.

15. A cloud-based system, comprising:
    a plurality of nodes communicatively coupled to one or more users, wherein the plurality of nodes each perform inline monitoring for one of the one or more users for security;
    wherein the plurality of nodes operate an operating system;
    wherein each of the plurality of nodes comprises:
        a network interface communicatively coupled to the one or more users;
        a data store;
        a processor communicatively coupled to the network interface and the data store;
        memory storing instructions that, when executed, cause the processor to:
            operate an old operating system with a partition structure for the data store, wherein the partition structure comprises a root partition with the old operating system and an usr partition, wherein an operating system only resides in the root partition;
            copy media to the root partition and the usr partition associated with a new operating system while the old operating system is operating in the root partition;
            reboot with the new operating system set to load from the root partition; and
            subsequent to the reboot, make the root partition persistent using the memory and the usr partition persistent using a NULL file system,
        wherein the old operating system and the new operating system reside in the root partition together.

16. The cloud-based system of claim 15, wherein the plurality of nodes are upgraded concurrently.

\* \* \* \* \*